United States Patent
Venkataramani et al.

(10) Patent No.: US 11,615,042 B2
(45) Date of Patent: Mar. 28, 2023

(54) COMMON FRAMEWORK FOR KERNEL-ASSISTED DEVICE POLLING

(71) Applicant: Nutanix, Inc., San Jose, CA (US)

(72) Inventors: Hema Venkataramani, San Jose, CA (US); Rohit Jain, Cupertino, CA (US)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 17/364,549

(22) Filed: Jun. 30, 2021

(65) Prior Publication Data

US 2022/0318169 A1 Oct. 6, 2022

Related U.S. Application Data

(60) Provisional application No. 63/169,176, filed on Mar. 31, 2021.

(51) Int. Cl.
*G06F 13/22* (2006.01)
(52) U.S. Cl.
CPC .......... *G06F 13/22* (2013.01); *G06F 2213/40* (2013.01)
(58) Field of Classification Search
CPC ............................. G06F 13/22; G06F 2213/40
See application file for complete search history.

(56) References Cited

U.S. PATENT DOCUMENTS

| 7,451,456 | B2 | 11/2008 | Andjelic |
| 8,225,329 | B1* | 7/2012 | Lynn ...................... G06F 13/28 710/39 |
| 8,549,518 | B1 | 10/2013 | Aron et al. |
| 8,601,473 | B1 | 12/2013 | Aron et al. |
| 8,850,130 | B1 | 9/2014 | Aron et al. |
| 9,378,047 | B1* | 6/2016 | Gould ..................... G06F 9/542 |
| 9,772,866 | B1 | 9/2017 | Aron et al. |
| 9,779,041 | B2 | 10/2017 | Aslot et al. |

(Continued)

OTHER PUBLICATIONS

"Best practices for Azure Container Registry," Microsoft Docs, dated Jan. 7, 2021.

(Continued)

*Primary Examiner* — Henry Tsai
*Assistant Examiner* — John B Roche
(74) *Attorney, Agent, or Firm* — Vista IP Law Group, LLP

(57) ABSTRACT

This disclosure relates to high-performance computing, and more particularly to techniques for kernel-assisted device polling of user-space devices. A common kernel-based polling mechanism is provided for concurrently handling both kernel-based polling for kernel-space devices such as network interfaces (e.g., network NICs) and kernel-based polling for user-space devices such as remote direct memory access devices (e.g., RDMA NICs). Embodiments perform kernel-based polling on a first device that has a corresponding device driver in an operating system kernel. Using the same polling mechanism, the kernel-based polling is performed on a second device, the second device being a user-space device wherein the kernel-based polling on the second device is configured by creating a second device file descriptor that is not associated with a corresponding device driver in the operating system kernel. The kernel-based polling mechanism implements a single polling schedule that is applied to cover both kernel-space device events and user-space device events.

24 Claims, 10 Drawing Sheets

(56) References Cited

U.S. PATENT DOCUMENTS

2017/0123971 A1* 5/2017 Kanaujia ............. G06F 12/0246
2021/0117360 A1* 4/2021 Kutch ................... G06F 9/5083

OTHER PUBLICATIONS

"Amazon ECR User Guide," AWS, dated Sep. 21, 2015.
"Generate synthetic events for poll," Github, date found via Internet Archive as Nov. 8, 2020.
Corbet, J., "A new kernel polling interface," LWN.net, dated Jan. 9, 2018.
Prado, S., "Linux kernel GPIO user space interface," #embeddedbits, date found via Internet Archive as Apr. 17, 2021.
"Poll and Select," O'Reilly home, date found via Internet Archive as Feb. 15, 2021.
"Implementing poll in a Linux kernel module," Javaer 101, dated Jul. 9, 2020.
"User space IO—Some Challenges & Mitigations," NetSecInfo, dated Jun. 21, 2010.
"Amazon ECS Adds Options to Speed Up Container Launch Times," AWS, dated May 24, 2018.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation*, NSDI '17, (Mar. 27, 2017).

\* cited by examiner

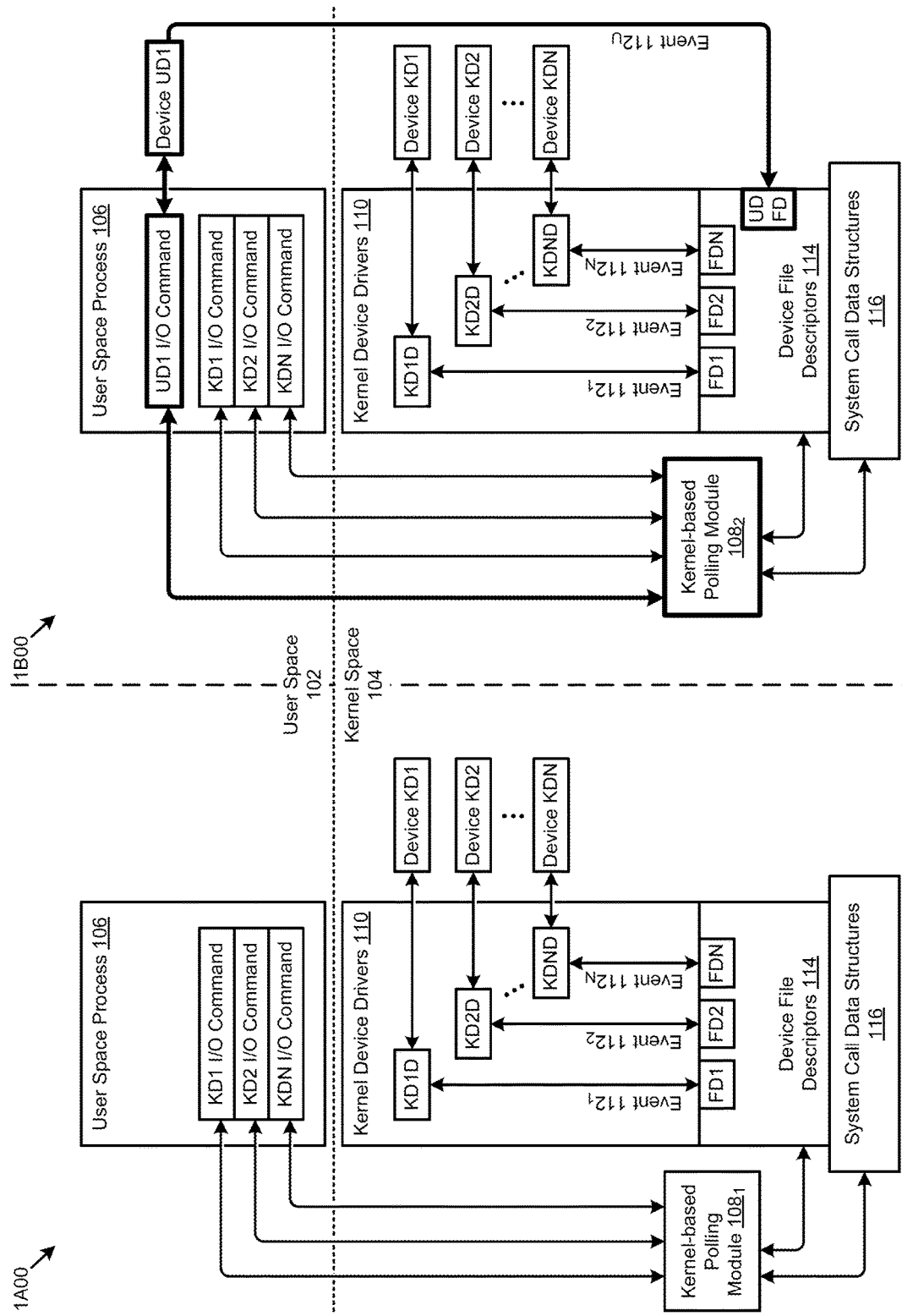

COMMON FRAMEWORK FOR KERNEL-ASSISTED DEVICE POLLING

RELATED APPLICATIONS

The present application claims the benefit of priority to U.S. Patent Application Ser. No. 63/169,176 titled "COMMON FRAMEWORK FOR KERNEL-ASSISTED DEVICE POLLING" filed on Mar. 31, 2021, which is hereby incorporated by reference in its entirety.

TECHNICAL FIELD

This disclosure relates to high-performance computing, and more particularly to techniques for kernel-assisted device polling of user-space devices.

BACKGROUND

Operating system kernels have long offered kernel-based management of asynchronous I/Os (inputs/outputs or IOs). In particular, devices that perform time-consuming I/O operations (e.g., disk-drive equipment, networking equipment, etc.) operate in a regime where certain portions of the device drivers for these devices are assisted by kernel-based functions. In this regime, when a kernel-space device completes an I/O, some portion of a kernel-based driver receives a signal (e.g., via an interrupt service routine). The kernel in turn, i.e., by operation of the kernel-based driver itself or by operation of an agent of the kernel-based driver, can inform user processes that the I/O has completed. If the user process had been SUSPENDED for completion of the I/O, then the kernel can mark the user process as READY for execution. In this manner, and due at least in part to the aforementioned kernel-based interrupt handling mechanisms, user processes are relieved from monitoring the device for the occurrence of an I/O completion. Moreover, user processes that are waiting for I/O completion need not consume CPU cycles while waiting.

In recent times, new types of devices, and correspondingly new operational architectures, have emerged. Some of these new types of devices support an operational architecture that permits user space to user space I/O without reliance on kernel-based I/O services. This architecture has the advantage that such I/Os can be performed without incurring context switching between user-space processing and kernel-space processing. Eliminating context switching between user-space processing and kernel-space processing often leads to greatly improved throughput, however, a consequence of eliminating reliance on the kernel means that access to kernel services that have been architected to process only kernel-space device events are not applicable. This effect then places the burden on the user-space processes to manage such events. This situation becomes complicated when a user process uses some devices that are kernel-based and some devices that are not kernel-based.

Unfortunately, this makes it difficult or impossible to coordinate processing of kernel-space device events with processing of user-space device events. What is needed is a way to coordinate kernel-based processing of device events when some of the devices are kernel-space devices and some of the devices are user-space devices.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products that implement a common framework for kernel-assisted device polling, which techniques advance the relevant technologies to address technological issues with legacy approaches. More specifically, the present disclosure describes techniques used in systems, methods, and in computer program products that implement a common framework for kernel-assisted device polling. Certain embodiments are directed to technological solutions for casting events from user-space devices into a kernel-based event routing facility.

The disclosed embodiments modify and improve over legacy approaches. In particular, the herein-disclosed techniques provide technical solutions that address the herein-described technical problems. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demand for computer processing power. In particular, various applications of the herein-disclosed improvements serve to reduce usage of a computer core from 100% usage to much less than 100% usage. This is because, when a computer core is dedicated to polling, the polling activities consume 100% of that core's CPU cycles. In contrast, when the herein-disclosed improvements are implemented, the polling activities consume much less than 100% that core's CPU cycles.

The herein-disclosed embodiments involve technological solutions pertaining to technological problems that arise in the hardware and software arts that underlie high-performance computing. Aspects of the present disclosure achieve performance and other improvements in peripheral technical fields including, but not limited to, hyperconverged computing platform management and operation of massively parallel computing systems.

Some embodiments include a sequence of instructions that are stored on a non-transitory computer readable medium. Such a sequence of instructions, when stored in memory and executed by one or more processors causes the one or more processors to perform a set of acts for casting events from user-space devices into a kernel-based event routing facility.

Some embodiments include the aforementioned sequence of instructions that are stored in a memory, which memory is interfaced to one or more processors such that the one or more processors can execute the sequence of instructions to cause the one or more processors to implement acts for casting events from user-space devices into a kernel-based event routing facility.

In various embodiments, any combinations of any of the above can be combined to perform any variations of acts that implement a common framework for kernel-assisted device polling, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1A exemplifies a first architecture that supports a kernel-based polling mechanism for handling events from kernel-space devices.

FIG. 1B exemplifies a second architecture that supports a common polling mechanism for handling events from kernel-space devices as well as events from user-space devices, according to an embodiment.

DETAILED DESCRIPTION

Figure 2A:
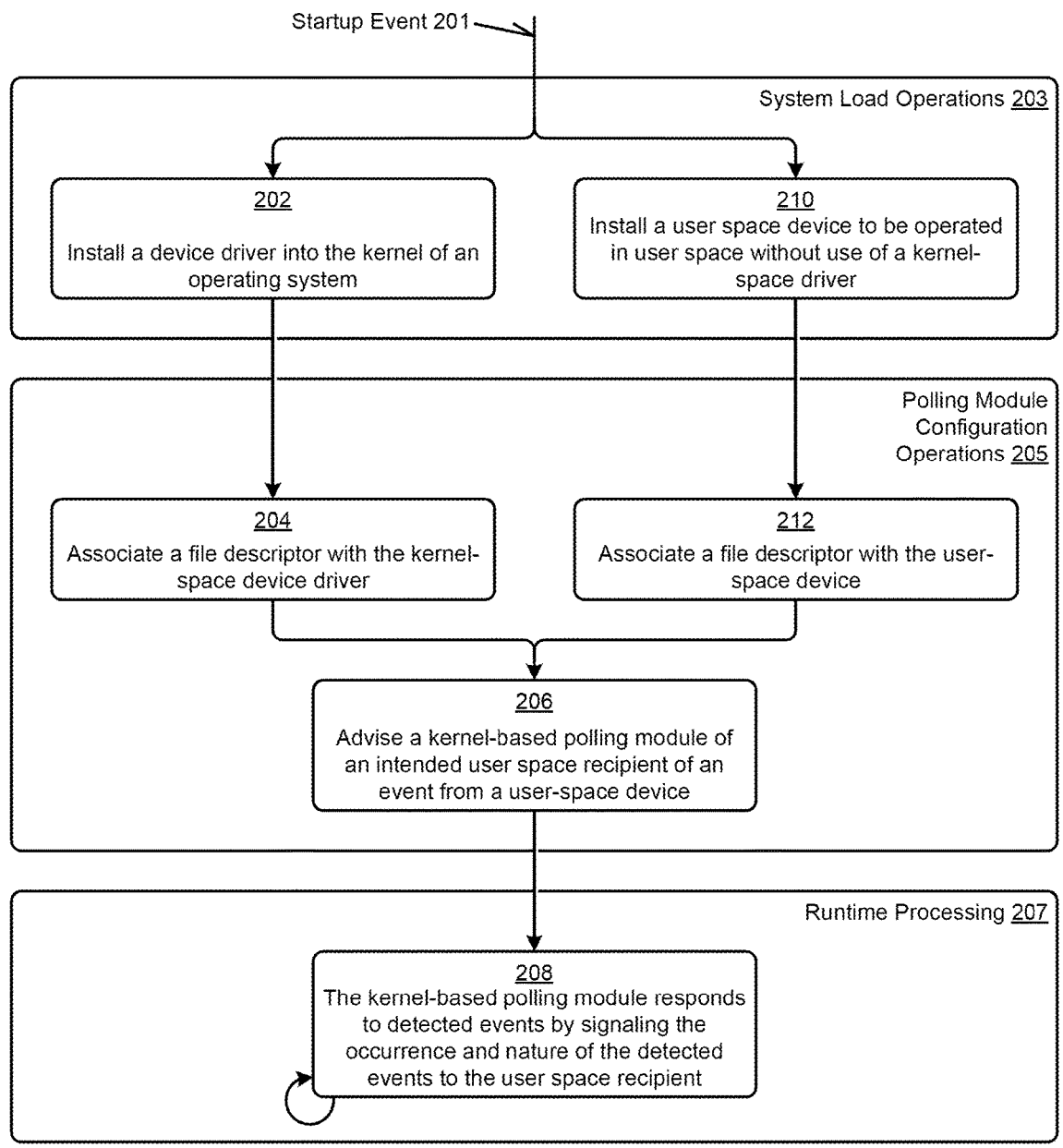
FIG. 2A presents a processing flow for implementing a common framework for kernel-assisted device polling, according to an embodiment.

Aspects of the present disclosure solve problems associated with using computer systems for providing a common, high-performance mechanism for kernel-assisted device polling. Some embodiments are directed to approaches for casting events from user-space devices into a kernel-based event routing facility. The accompanying figures and discussions herein present example environments, systems, methods, and computer program products that implement common a kernel-assisted device polling regime that covers both user-space devices as well as kernel-space devices.

Overview

Polling facilities provided for data I/O management often provide asynchronous event handling using file descriptors registered by callers through calls and/or callbacks. To set this up, a caller registers a file descriptor (fd) and a callback function with a polling module instance. The polling module instance maintains a map associating each file descriptor to its state. The map includes an indication of which callback is to be invoked upon detection of corresponding events. In various implementations, each polling module instance uses a dedicated thread to poll a device and handle any events triggered on a registered file descriptor. As such, the dedicated thread to perform polling and the corresponding handling of any events triggered may always be busy (i.e., 100% utilization). This is because the polling is carried out continuously such that whenever an event is triggered on a file descriptor, the corresponding callback function is immediately invoked and polling is immediately resumed, thus resulting in a polling thread that is always busy (i.e., 100% utilization).

In legacy implementations, the polling modules have been used only for TCP socket file descriptors (file descriptors). However, as part of certain improved data I/O managers, these improved I/O managers provide support for remote direct memory access (RDMA) I/O, non-volatile memory express (NVMe) I/O as well as network socket I/O (e.g., via TCP socket connections). As discussed herein, RDMA is used as a network transport that allows direct memory access operations between peer RDMA network interfaces (RDMA NICs). Such transport is carried out by and between user space applications, thereby eliminating memory copies and context switches that are associated with context switching between user space and kernel space. As such, the polling modules in data I/O managers would advantageously handle not only events that are raised in the kernel (e.g., events from network socket connections) but also events that are raised in user space. Effective polling strategies consider changing temporal patterns of occurrences of a large number of possible events so as to avoid introducing delays in notifying a call of the occurrence of a registered event. Different devices exhibit different temporal patterns of occurrences of their respective I/O completions. As such, specific techniques for managing user-space devices are discussed hereunder and as pertains to the appended figures.

To explain, consider that a user-space device (e.g., an RDMA device), and/or logical constructions such as an I/O channel (e.g., an RDMA channel) can be associated with a file descriptor. Further consider that a user space library provides a polling API which must be invoked when an event is triggered on that file descriptor. The file descriptor serves as a handle that can be interrogated, which interrogation results in knowledge that some event had occurred or was triggered. In order to examine all occurrences that had happened as part of the event, additional APIs may be invoked. Such APIs can be configured to reap many pollable file descriptors (e.g., all pollable file descriptors of a particular user process). As such, at the time that any event on any file descriptor occurs or, more specifically, at the time the callback function is called, all registered file descriptors can be checked within the context of the callback function. This results in a highly-efficient mechanism for reaping I/O completions.

One way to create and use file descriptors is to first configure a callback routine to return a feedback value. This returned feedback value indicates the number of I/O completions reaped during the callback. Then, though strictly as one example, ongoing operations can be carried out as follows:

1. When a kernel-based polling module instance detects an event on any file descriptor, the foregoing callback is invoked, after which invocation, kernel-based polling module resumes processing its own thread.
2. The kernel-based polling module thread continues to iterate amongst the registered pollable file descriptors. So long as each iteration is performing some meaningful work in an I/O operation mode, a next iteration is started. More specifically, in some implementations, iterations continue so long as at least one file descriptor is returning a non-zero I/O completion in that iteration.
3. When there comes an iteration amongst the registered pollable file descriptors where no file descriptor has performed any meaningful work, the kernel-based polling module will spin for an additional time period (e.g., 100 μsecs, or another tunable duration) before going back to polling. However, if the interrogation of any file descriptor resulted in performance of some meaningful work, the kernel-based polling module will reset its idling-period timer. If no activity is deemed to have happened in this idling period duration, then the kernel-based polling module goes back to polling for events such as described in step 1 above. The steps 1 through 3 repeat.

The embodiments disclosed herein below and in the appended figures leverage a common framework for any pollable device, regardless of whether it is a user-space device or regardless of whether it is a storage device or a network device, or even a virtual (e.g., purely software) device.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies a first architecture 1A00 that supports a kernel-based polling mechanism for handling events from kernel-space devices. As an option, one or more variations of kernel-based polling mechanism or any aspect thereof may be implemented in the context of the architecture and functionality of the embodiments described herein. The kernel-based polling mechanism or any aspect thereof may be implemented in any environment.

The figure is being presented to illustrate how an operating system kernel can be organized to be able to handle events for devices that have corresponding user space drivers. The particular architecture shown implements a kernel-based polling module that can handle events that cause execution of a callback routine or an interrupt service routine, regardless of whether the event was raised by the effect of an interrupt from a kernel-space device or by the effect of polling of some aspect of (e.g., a register of) a kernel-space device.

Legacy Context Switching Mechanisms

For dealing with kernel-resident devices, a user-space process 106 within user space 102 can create a file descriptor (e.g., the shown file descriptor file descriptor1 (FD1), file descriptor file descriptor2 (FD2), . . . , file descriptor file descriptorN (FDN)) that is associated with respective devices in kernel space 104 (e.g., kernel device KD1, kernel device KD2, . . . , kernel device KDN) which in turn are each associated with their respective device's kernel-space device driver (e.g., kernel-space device driver KD1D, kernel-space device driver KD2D, . . . , kernel-space device driver KDND).

In this architecture, when a device that has a kernel-space device driver raises an interrupt (e.g., at the completion of an I/O (input/output or IO) command), then some portion of the kernel-based driver corresponding to the foregoing device is executed (e.g., via an interrupt service routine corresponding to the particular interrupt). In some cases, the interrupt service routine corresponding to the particular interrupt may schedule further portions of the kernel-based driver to be executed. More specifically, the interrupt service routine or further portions of the kernel-based driver may raise an event (e.g., event $112_1$, event $112_2$, . . . , event $112_N$) to a file descriptor (file descriptor file descriptor1, file descriptor file descriptor2, . . . , file descriptor file descriptorN, respectively) which event is, in turn, routed to the user-space process. In the example of FIG. 1A, the user-space process shows an I/O command for each of the kernel device drivers 110.

Further, in the example of FIG. 1A, the event is routed to the user-space process. Such routing of the event can be accommodated by a mechanism provided by the device file descriptors 114, and/or via a mechanism provided by the system call data structures 116 and/or via a mechanism provided by kernel-based polling module $108_1$. As shown, the user-space process 106 interacts with the kernel-based polling module via I/O commands (e.g., KD1, KD2, KD3), and the kernel-based polling module interacts with the user process via values returned upon completion of an I/O command or commands.

Memory Mapped Devices

In some cases, a device may expose device-resident values that can be read and written by a register access (e.g., via access to a memory-mapped address that corresponds to the register). Moreover, in some cases, the device driver and/or a polling mechanism and/or a user process might want to periodically check (e.g., via polling) a device-resident value. Such device resident values can be configured to be driven to a particular value upon an I/O completion. Even though such a device might be memory mapped into user space, using the herein-disclosed techniques, such a device can nonetheless be included in the kernel-based polling This can be implemented using the kernel-based polling techniques described herein. More specifically, this can be implemented by a kernel-based polling module that interfaces between kernel space and user space. Still more specifically, this can be accommodated by a kernel-based polling module that handles file descriptors on both user space devices (e.g., RDMA network interface devices) and file descriptors on kernel space devices (e.g., network interface devices).

The example of FIG. 1A does not show any user-space devices. However, user-space devices have become common in recent times. More particularly, user-space devices have become common in the context of virtualization systems where user-space processes (e.g., virtual machines) communicate among themselves using user-space communication protocols. Use of user-space devices for inter-processes communication between user-space processes (e.g., virtual machines) often results in greatly improved communication performance (e.g., lower latency, higher aggregate throughput, etc.). This is because, when implementing inter-processes communication between user-space processes over user-space devices, the context switching between user space and kernel space can be almost entirely eliminated. Especially in situations where the inter-processes communication between user-space processes comprises relatively small bursts of traffic, avoiding context switches from user space to kernel space and back can contribute greatly to the improved overall communication performance.

Unfortunately, implementing a user-space device and its user space driver solely in user space fails to take advantage of polling mechanisms that are available in the legacy architecture of FIG. 1A. More specifically, in some scenarios involving a particular user process that uses both user-space devices as well as kernel-space devices, coordination between interrupt- or polling-based events arising from kernel-space devices with polling events that arise from the user-space devices can improve overall performance by (1) coordinating the timing of ongoing polling activities between user-space devices and kernel-space devices, and (2) coordinating interrupt handling activities as between user-space devices and kernel-space devices—while avoiding context switches whenever possible.

To illustrate, consider a case where an event was raised by a kernel-space device, which event could at least potentially be routed to a user-space process. Further consider that a user-space device completed an I/O at the same time. One way to at least attempt to address the contemporaneous events is to route the event (e.g., using a kernel-space device driver) to its corresponding user-space process, and then for the user-space process to carry out a polling operation in user space. An alternative way to handle the contemporaneous events is to handle both the event raised by the kernel-space device driver and then to carry out a polling operation pertaining to the user-space device in the same context. Unfortunately, the architecture of FIG. 1A does not include any mechanism for coordinating a user-space device operation with a kernel-space device operation. What is needed is an improved architecture that supports a mechanism for handling events from kernel-space devices as well as events from user-space devices. More specifically, what is needed is an improved architecture that supports a common polling mechanism for handling events from kernel-space devices as well as events from user-space devices. Such an improved architecture is shown and discussed as pertains to FIG. 1B.

FIG. 1B exemplifies a second architecture 1B00 that supports a common polling mechanism for handling events from kernel-space devices as well as events from user-space devices. As an option, one or more variations of common polling mechanism or any aspect thereof may be implemented in the context of the architecture and functionality of the embodiments described herein. The common polling mechanism or any aspect thereof may be implemented in any environment.

As shown, a user-space device (e.g., device UD1) is integrated with kernel device operation through use of a file descriptor (e.g., UDFD), which in turn is integrated with the shown kernel-based polling module $108_2$. In operation, a user-space device (e.g., device UD1) can raise an event (e.g., event $112_U$) into its file descriptor. The event (e.g., the shown event $112_U$) can thusly be coordinated with any other events that might have occurred, or are occurring, or are soon to occur on the other file descriptors (e.g., file descriptor1 (FD1), file descriptor2 (FD2), . . . , file descriptorN (FDN)). More specifically, both user-space events raised by user-space devices as well as kernel-space events raised by kernel-space devices can be handled by the same instance of kernel-based polling module $108_2$. As such, this mechanism supports a common polling mechanism for handling events from kernel-space devices as well as events from user-space devices.

As used herein, a user-space device is a hardware device (e.g., an RDMA NIC) that carries out I/O directly into the memory space of a user-space process. These direct-access-memory-space I/O devices s are different from kernel-space devices at least in that kernel-space devices, in order to place data into the memory space of a user-space process, relies on a copy of data from kernel space into user space. Moreover, as used herein, a user-space device is a hardware device that carries out data I/O operations between one hardware component (e.g., a computer) to another hardware component (e.g., another computer, or a storage device). This is different from a virtual user-space device such as a clock. As used herein, a user-space device is a hardware device that has at least one pollable component (e.g., a memory-mapped register, an exposed register, a port, etc.)

Polling States

Embodiments of kernel-based polling modules implement transitions between idle and polling states. More specifically, some embodiments of kernel-based polling modules implement a mechanism whereby a caller can expressly turn off polling of a particular file descriptor for a specified duration. Still more specifically, a caller can itself predict a duration during which no event is expected, or a duration during which the caller can specify as the earliest/soonest that the caller would expect its callback function to be invoked. User process management of turning ON or OFF such polling can be implemented so as to reduce unnecessary polling, which in turn may improve (i.e., reduce) overall I/O latency. The term "ON/OFF busy" is used throughout to refer to such configurable polling. Any file descriptors that require ON/OFF busy polling are registered as such. As used herein, the term "ON/OFF busy polling" refers to the repeated invocation of the callbacks associated with pollable file descriptors as heretofore described. The ON and OFF mechanism of the ON/OFF busy polling technique used herein refers to busy-polling being OFF when polling using the kernel-based polling module rather than busy-polling or "spinning" by repeatedly, and often unnecessarily invoking the callback of the file descriptor. When busy-polling is ON, the polling module is in a spin loop that is repeatedly invoking the callback of the file descriptor. As such, control of the polling mechanism using ON/OFF busy polling logic greatly reduces the amount of CPU cycles that would be spent during spinning and/or during repeated execution the callback of the file descriptor.

During ongoing operation of the system, and in response to an event on a file descriptor (e.g., in response to a completion of an I/O command or commands), the operating system will modify a process table to indicate a user-space process is ready for additional processing.

Comparative RDMA Scenarios: Numeric Examples

Context Switches in a legacy scenario: A user space application does an RDMA_WRITE and goes back to the kernel-based polling module. Three context switches are required to complete the IO operation:

Context Switch #1. The RDMA_WRITE completion event is generated which leads to a first context switch. The application then does an RDMA_SEND to notify the receiver.

Context Switch #2. The act of receiving the foregoing RDMA_SEND at the receiver generates an event which leads to a second context switch. The receiver then sends a response to RDMA_SEND.

Context Switch #3. The response to RDMA_SEND sent by the receiver is processed by the sender, which generates an event which in turn leads to a third context switch.

Numeric Example (Legacy RDMA Scenario) and Motivation for Improvement

The first context switch pertains to posting a new I/O (e.g., an RDMA_SEND) after a previous I/O (e.g., an RDMA_WRITE) has completed. The second context switch is for the server to proactively poll to satisfy a client's request. The third context switch is for the client to proactively poll for the server's response. Each context switch requires roughly 15 μsecs for just the operating system context switch (i.e., in addition to the latency path), so roughly 45 μsecs can be saved if the context switches were to be completely eliminated. In contrast, a single RDMA operation (e.g., an RDMA_WRITE or RDMA_SEND opcode) can complete within 5 μsecs in polling mode. In one implementation using remote procedure calls (RPC), such an implementation might require three opcodes overall (two on the client side to send a request out and one on the server side to send a response back), so only 15 μsec (i.e., three opcodes times 5 μsecs in polling mode per each opcode) plus the time to process received messages at either end is consumed. As such the improvement over legacy can yield a 30-45 μsec IO latency savings just by using a polling approach that avoids context switches.

RDMA Scenario With Improvements Over Legacy

Consider the case where RDMA_WRITE and RDMA_SEND are opcodes that initiate an outgoing transfer. The RDMA_WRITE implements one-sided CPU involvement, whereas the RDMA_SEND is two-sided with a CPU at both ends involved. These opcodes operate as follows:

Operation #1: After performing the RDMA_WRITE, the application uses a common polling mechanism wait for the RDMA_WRITE completion—without reliance on context-switch inducing interactions with the kernel-based polling module.

Operation #2: When RDMA_WRITE completes, it sends RDMA_SEND to the receiver and again busy-waits for the response from the receiver (without reliance on the kernel-based polling module and thus without a context switch). The combination of operation #1 and operation #2 eliminates two context switches as compared to the legacy case. The receiver will still incur one context switch because of the event generated on receiving the RDMA_SEND opcode.

Further Improvements Using Batching of Messages

An RDMA_WRITE is one-sided and only the sender gets notification of the completion. The receiver is oblivious to this so the sender sends an RDMA_SEND opcode to notify the receiver and one context switch would be incurred. However, in some cases, RDMA_SENDs can be batched for sending multiple messages together. There is only one context switch incurred for the batch. When there is only one message outstanding at a given time, the opportunity to combine notifications for multiple messages (e.g., in a batch) does not exist. As such, when there is only one message outstanding at a given moment in time, the processing of that individual message will incur a single context switch.

Common Framework

The embodiments disclosed herein leverage a common polling mechanism for any pollable device, regardless of whether it is an RDMA device, a storage device, a network device, or a virtual (e.g., purely software) device. Furthermore, the mechanisms and embodiments disclosed herein function in the foregoing scenarios irrespective of whether or not any of these subsystems do or do not provide their own file descriptor for integrated kernel-based polling. Specifically, there are certain subsystems (e.g., those subsystems used for performing IO to non-volatile memory express (NVMe) devices), where those certain subsystems do not themselves provide any file descriptor that can be registered with the kernel-based polling module. Instead, in such cases, a proxy file descriptor is registered with the kernel-based polling module as heretofore described. As such, even subsystems that do not provide their own native file descriptor can nevertheless leverage the disclosed common framework for any types of pollable devices.

FIG. 2A presents a processing flow 2A00 for implementing a common framework for kernel-assisted device polling. As an option, one or more variations of processing flow for implementing a or any aspect thereof may be implemented in the context of the architecture and functionality of the embodiments described herein. The processing flow or any aspect thereof may be implemented in any environment.

The figure is being shown to illustrate one way of how a common framework for kernel-assisted device polling can be established and configured for runtime processing. The shown processing flow commences upon occurrence of a startup event 201. The startup event invokes several system load operations 203, which system load operations comprise installing a device driver into the kernel of an operating system (step 202) and installing a device to be operated in user space without use of a kernel-based driver (step 210).

The processing flow then moves to carry out various polling module configuration operations 205, Such polling module configuration operations may include associating a file descriptor with the kernel-space device driver (step 204) and associating a different file descriptor with events that pertain to the user-space device (step 212).

The aforementioned file descriptors (e.g., the file descriptor of the kernel-space device driver and the different file descriptors associated with events that are emitted by the user-space device) are used to inform the kernel-based polling module that events on the foregoing file descriptors are to be coordinated (step 206). The system is now initialized such that runtime processing 207 can be carried out continuously. Specifically, step 208 is continually active during runtime such that the kernel-based polling module responds to detected events by signaling the occurrence and nature of the detected events to a corresponding user space recipient.

When the aforementioned mixed-type file descriptors (e.g., some file descriptors pertaining to the kernel-space device drivers and some other file descriptors associated with user-space devices) are interfaced with the kernel-based polling module, the kernel-based polling module can be implemented on a single processing core of a multi-core processor. This has many benefits, one of which is that rather than consuming 100% of the cycles of an entire processor core that would be needed for pure user space polling, less than 100% of the cycles of the processor core would be consumed in spite of the fact that the kernel-based polling module is able to handle polling for both user-space devices as well as kernel-resident device drivers.

Scenarios where there are mixed-types file descriptors emerge more and more as there are more and more devices that are usable and/or are intended to be used for user space functions. Strictly as examples, devices that are usable and/or intended to be used for user space functions include RDMA NICs and non-volatile memory express (NVMe) devices.

Figure 2B:
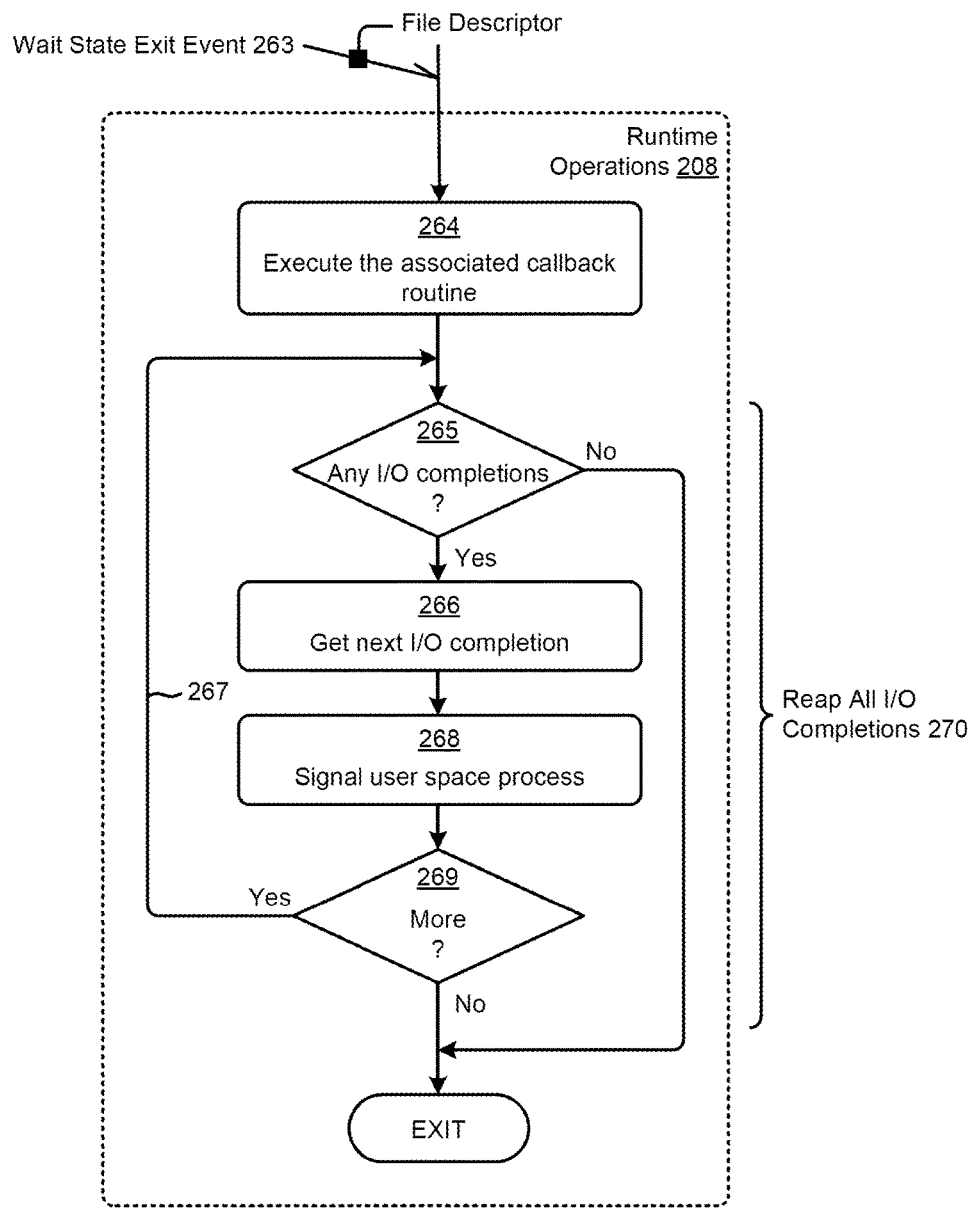
FIG. 2B presents processing flow details for reaping I/O completions in response to a kernel-based polling facility, according to an embodiment.

FIG. 2B presents processing flow details 2B00 for reaping I/O completions in response to a kernel-based polling event. As an option, one or more variations of the processing flow details or any aspect thereof may be implemented in the context of the architecture and functionality of the embodiments described herein. The processing flow details or any aspect thereof may be implemented in any environment.

As shown, the processing flow details include a set of runtime operations (step 208). The shown runtime operations are invoked when an exit from an event wait state (wait state exit event 263) occurs. The runtime operations, specifically step 264, assumes that a callback routine setup operation had been completed (e.g., as a part of registering a file descriptor). More specifically, the runtime operations assume that a callback routine setup operation had been carried out so as to associate a particular callback routine with a particular event file descriptor.

The runtime operations 208 of a kernel-based polling module can handle events that pertain to file descriptors that are associated with kernel-resident devices as well as file descriptors that are associated with devices that do not have corresponding kernel resident device drivers. In some cases a certain class of file descriptors (e.g., "event file descriptors") are associated with specific classes of events rather than specific devices. An event file descriptor may pertain to a real or virtual device that does not have a kernel resident device driver. Such an event file descriptor is a data structure on which read I/O, a write I/O, and other I/O events can be indicated and operated over, such as by operation of a kernel-based polling module. In example embodiments, such a data structure is formed in response to a Linux system call.

The foregoing kernel-based polling module may recognize multiple processing states. One of the processing states is designated as a kernel-based polling module wait state. There can be many reasons why the kernel-based polling module wait state is exited. Regardless of the reason for exiting the kernel-based polling module wait state, upon a wait state exit event 263, then at step 264, the callback routine that was associated with the file descriptor is executed. In this embodiment, the callback routine that was associated with the file descriptor checks for any I/O completions that might be associated with the file descriptor. If there are any I/O completions, the "Yes" branch of decision 265 is taken and a loop is entered; however, if there are no I/O completions associated with the file descriptor, then the "No" branch of decision 265 is taken.

The aforementioned loop checks for flags and/or other indications of an I/O completion from user-space processing, if any (step 266) and, based on the specific I/O completion detected, a user-space process that was waiting on that I/O completion is signaled (step 268). If, based on the outcome of decision 269, if there still remain additional I/O completions that have not been processed in the foregoing iterations through loop 267, then the "Yes" branch of decision 269 is taken and the loop is again entered from the top. Otherwise, the "No" branch of decision 269 is taken and the callback routine exits. The iterative processing of loop 267 serves to reap all I/O completions (process 270), thus avoiding unnecessary context switches in the case that there are multiple I/O completions that occur more or less contemporaneously.

The foregoing callback routine serves as an extension to kernel-based polling. The callback routine facilitates use of kernel-based polling mechanisms in a manner that handles both (1) kernel-space events and (2) user-space events.

Figure 3A:
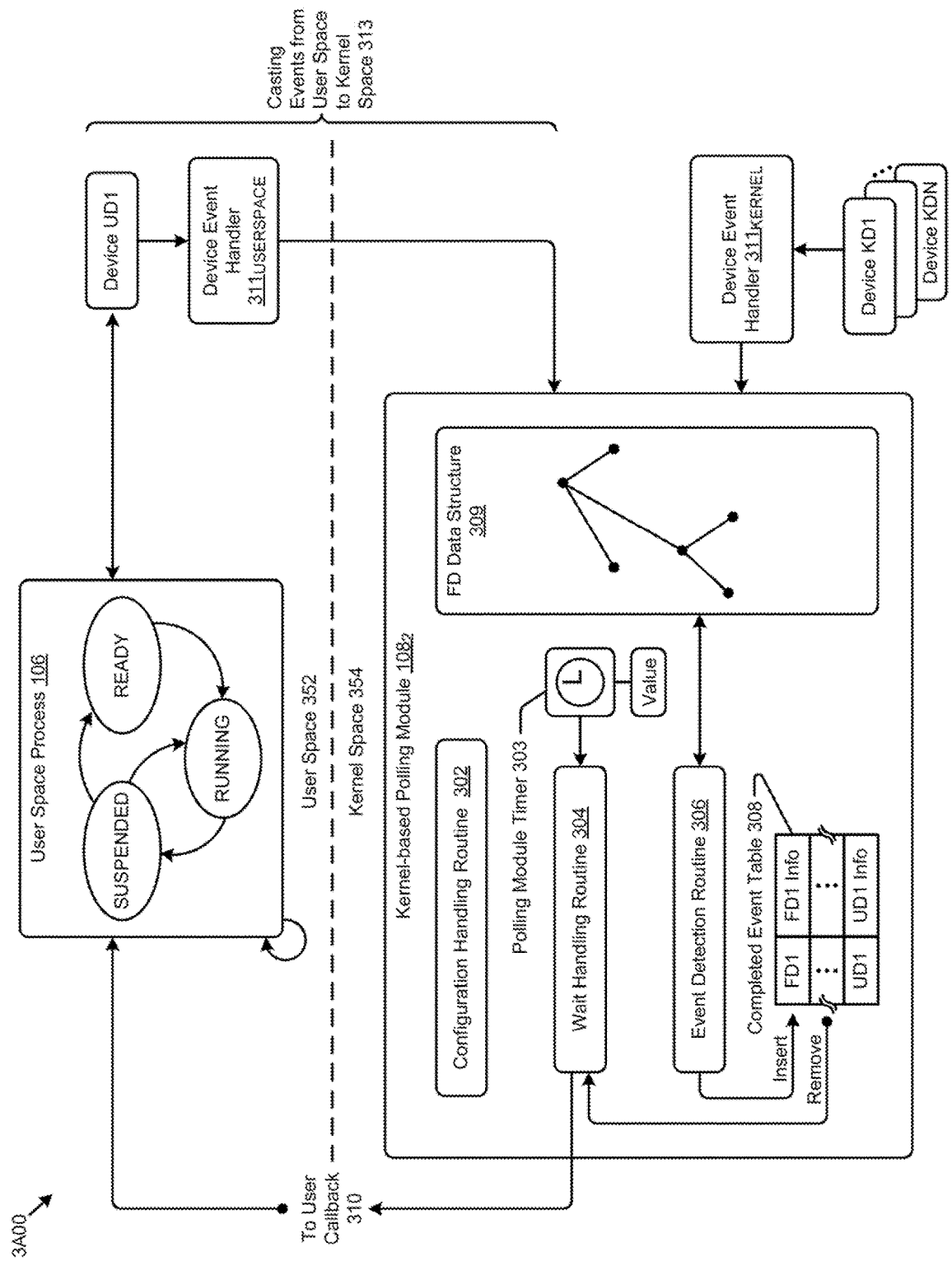
FIG. 3A depicts a kernel-based polling mechanism that handles both kernel-space device events and user-space device events, according to an embodiment.

FIG. 3A depicts a kernel-based polling mechanism 3A00 that handles both kernel-space device events and user-space device events. The figure is being presented to illustrate the inner-workings of the shown kernel-based polling module $108_2$ with respect to user-space process 106. Specifically, the figure is being presented to show how a user-space device (e.g., device UD1) can be handled in coordination with any kernel-space devices (e.g., device KD1, . . . , device KDN).

As shown, an instance of a user-space device (e.g., device UD1) is associated with a device event handler $311_{USERSPACE}$. Also, an instance (or multiple instances) of kernel-space devices are associated with device event handler $311_{KERNEL}$. Both instances of the different types of event handlers (e.g., device event handler $311_{USERSPACE}$ and device event handler $311_{KERNEL}$) deliver events to the file descriptor data structure (i.e., FD data structure 309) of the kernel-based polling module. Delivery of events from user space 352 to the file descriptor data structure is carried out by casting events from user space 352 to the kernel space implementation of the kernel-based polling module (e.g., via mechanism 313). Such casting, specifically, delivery of events from user space 352 to the file descriptor data structure is done via a write( ) system call that normally would incur a context switch because of the transition from user space 352 to kernel space 354. However, the delivery of such events occurs only when the kernel-based polling module is not already processing IO completions. As a result, a casting-incurred context switch is avoided in scenarios where the kernel-based polling module thread is already in the "busy-wait" loop. That is, if the kernel-based polling module is in wait-state in the kernel, then the event can be delivered to the event file descriptor as described above using a write( ) system call.

Ongoing handling of events (of any provenance) is carried out by event detection routine 306. Such an event detection routine may access the file descriptor data structure to identify file descriptors onto which some event had posted. When a then-current event is identified, then it is inserted to I/O completion table 308. Many events can be inserted into the I/O completion table in one cycle. Such completed events can be removed by wait handling routine 304. More specifically, the wait handling routine identifies a callback routine that had been registered by operation of configuration handling routine 302 and that corresponds to a particular file descriptor, and then executes that identified callback routine. In the specific example of FIG. 3A, the shown callback is to user callback 310. Event notification to advise the operating system of an occurrence of the event can be accomplished by operation of the callback routine, and/or notification to advise the operating system of occurrence of the event can be accomplished by operation of wait handling routine 304 (e.g., via a kernel-based operating system call). Upon processing of a particular event of I/O completion table 308, the particular event can be removed from the completed event table. As such, all events, including all I/O completions, can be reaped in one context switch.

In the specific embodiment of FIG. 3A, the kernel-based polling module is depicted within kernel space 354. However, many of the facilities that are used to implement common kernel-based polling can be situated in user space 352. More specifically, the configuration handling routine and the wait handling routine, as well as any timer and/or timer-related utility routines can be situated in user space 352. In some deployments, the aforementioned routines can interact with unmodified, pre-existing polling drivers (e.g., polling facilities of a host operating system) via system calls.

Wake-Up Facilities

In the case that user space events do not raise an interrupt, which would invoke processing within the kernel-based polling module, some means to 'wake up' the kernel-based polling module frequently enough to be able to quickly respond to completed I/Os that may have occurred by operation of a user-space device is needed. One means is to implement creation, calibration, and destruction of such a timer (e.g., polling module timer 303) is shown and discussed as pertains to FIG. 3B.

Figure 3B:
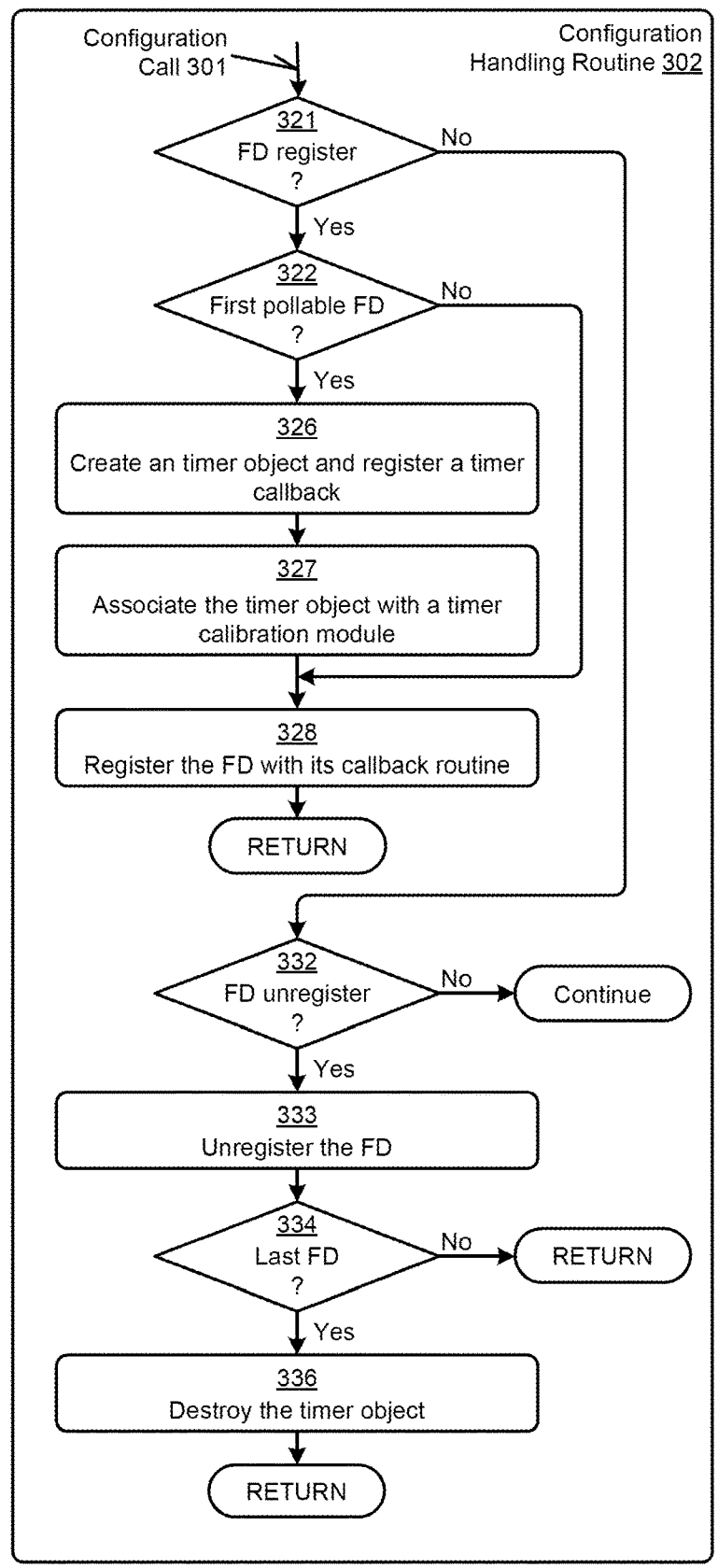
FIG. 3B depicts a method for creation and destruction of a timer that is used to tune a device polling interval when handling both kernel-space device events and user-space device events, according to an embodiment.

FIG. 3B depicts a method 3B00 for creation and destruction of a timer that is used to tune a device polling interval when handling both kernel-space device events and user-space device events, according to an embodiment.

When implementing a kernel-based polling module that handles events from both kernel-space device events and user-space device events it can happen that certain user-space devices perform I/O in a very short amount of time—sometimes on the order of microseconds or even on the order of some number of nanoseconds. However, rather than constantly polling at microsecond intervals, a timer can be calibrated (e.g., set, reset, reset again, etc.) on an ongoing basis, and in a manner that addresses then-current operational conditions.

Strictly as one example, such a timer can be created (and destroyed) by operation of configuration handling routine 302. Specifically, a timer and a corresponding timer file descriptor are created by operation of configuration handling routine 302. This timer file descriptor is created when the first pollable file descriptor is registered (step 321), and destroyed when the last pollable file descriptor is unregistered (step 334). The timer file descriptor is handled similarly with respect to the full set of pollable file descriptors that are registered as part of a kernel-based polling module configuration call.

The method 3B00 more particularly points out how a fine-grained timer can be created, and initially configured concurrently with registration of file descriptor, and then eventually destroyed. Specifically, and as shown, upon occurrence of a configuration call 301 to configuration handling routine 302, the first test (e.g., decision 321) is to determine if the configuration call is for a file descriptor registration. If not, the "No" branch of decision 321 is taken. Otherwise, another test (e.g., decision 322) determines if this is the first file descriptor registration call for a pollable file descriptor. If so, the "Yes" branch of decision 322 is taken, after which a timer object is created (step 326), which timer object is registered with a corresponding timer callback routine, and then the timer object is associated with a timer calibration module (step 327). The timer object is now in a condition to be calibrated on a continuing basis as operational conditions change over time. Moreover, the pollable file descriptor that was referred to in configuration call 301 is now registered in association with its callback routine (step 328). On the other hand, at decision 321, if is determine that this call not the first file descriptor registration call for a pollable file descriptor, then the "No" branch of decision 322 is taken.)

In the event that the "No" branch of decision 321 is taken, then a test (decision 332) is made to determine if the configuration call pertains to unregistering a file descriptor. In the event that the configuration call does not pertain to unregistering a file descriptor, and since it had already been established that the configuration event does not pertain to registering a file descriptor (e.g., per decision 321), then the configuration call pertains to some other type of configuration. The "No" branch of decision 322 is taken and configuration processing continues. On the other hand, if the configuration call does pertain to unregistering a file descriptor, then the file descriptor is unregistered (step 333). If this is the last file descriptor from among all previously registered file descriptors (decision 334) then the "Yes" branch of decision 334 is taken and step 336 operates to destroy the timer object. On the other hand, if this call does not operate to unregister the last file descriptor from among all previously registered file descriptors, then the "No" branch of decision 334 is taken and the configuration handling routine returns to its caller.

The timer can be calibrated repeatedly as ongoing conditions change. One technique for ongoing timer calibration is shown and described as pertains to FIG. 3C.

Figure 3C:
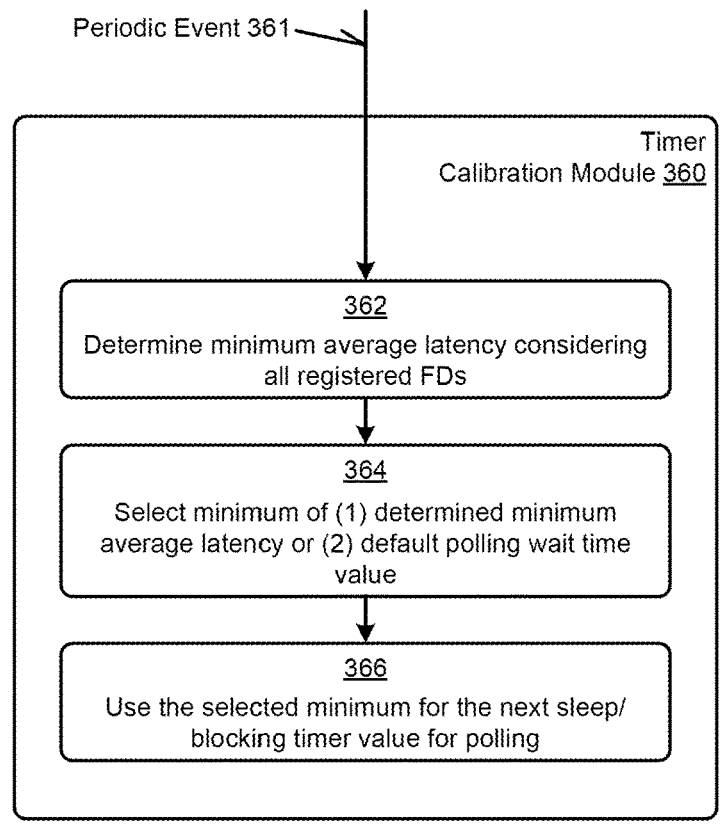
FIG. 3C depicts a method for ongoing calibration of a device polling interval that is used to implement a kernel-based polling mechanism that handles both kernel-space device events and user-space device events, according to an embodiment.

FIG. 3C depicts a method 3C00 for ongoing calibration of a device polling interval that is used to implement a kernel-based polling mechanism that handles both kernel-space device events and user-space device events, according to an embodiment.

In one particular embodiment, such as described with respect to FIG. 3C, users of a kernel-based polling module additionally registers a second callback routine. This second callback routine returns the average latency/IO completion time for its file descriptor. Periodically (e.g., via occurrence of a periodic event 361 and via performance of step 362), the minimum of all the callers' average latency is calculated. This average minimum is compared (e.g., per step 364) with a default wait threshold. The minimum of the two is selected as the result for the next sleep/blocking time for the subsequent polling calls (step 366). The foregoing computation can occur repeatedly, for example, when the ON/OFF busy polling schedule completes. As such, the timer is calibrated repeatedly to track and account for changing operational conditions.

A timer calibration module 360 is integrated within the kernel-based polling module such that when polling wait state is entered, a timer alarm set to expire on the order of microseconds or nanoseconds is established.

Alternative Embodiments

Performance in the Presence of Multiple I/O Regimes

The kernel-based polling module's busy poll logic allows sharing of a single instance with various I/O regimes as correspond to the differences between SPDK, RDMA, and TCP. In fact, any producer/consumer relying on asynchronous notifications can use this busy poll logic by integrating with the kernel-based polling module. This is true irrespective of whether or not the device is associated with a real hardware device or not. By enabling multiple subsystems to share the same kernel-based polling module instance, and by bringing them under a single polling schedule, the number of poller system calls (e.g., Linux epoll( ) system calls) is minimized. Moreover, enabling multiple subsystems to share the same kernel-based polling module instance, such that they are managed under a single polling schedule, the number of unnecessary polling iterations is minimized.

In a stable state with many concurrently running IOs, the kernel-based polling module driver thread will have enough work to sustain with ON/OFF busy polling, however, when a gap in the IO pattern occurs, recognition of the gap can cause entering into the poller wait state.

Additional Optimizations

It is possible to cause an event on the 'event file descriptor' when an IO is submitted. This is to ensure the kernel-based polling module is kickstarted. This kickstart implements a system call and should be avoided where possible. One way to accomplish this is by only kickstarting the event file descriptor when the kernel-based polling module driver instance is not in busy poll mode. To know this, the kernel-based polling module can pass its state as part of the callback invocation to know whether the callback is being invoked due to a raised event (in this case due to a kickstart) or from a busy poll mode. This state can be cached as part of the caller to optimally issue the kicks. This leverages the ON/OFF busy polling as heretofore described and extends it further.

Event Handling With the SPDK

SPDK does not offer a file descriptor of its own. One approach is to create a 'fake'/event file descriptor per SPDK executor instance which is registered with kernel-based polling module as a placeholder pollable file descriptor. In a similar manner as how the kernel-based polling module handles RDMA file descriptors, since the special pollable file descriptors are registered, the kernel-based polling module will provide the same ON/OFF busy polling logic by calling their registered callbacks in a loop until the callbacks' value returned indicates no meaningful work happened for the idle duration. In various implementations the concept of a generic timer file descriptor is implemented in the kernel-based polling module, and also, a facility to register a second callback, which will be invoked for every file descriptor, is configured to return the average IO completion time for that file descriptor. This time returned is used to calibrate the timer file descriptor in kernel-based polling module to determine the optimal sleep time. That way the kernel-based polling module will wake proactively based on the next expected IO completion time once its ON/OFF busy polling has completed and gone to polling wait state due to no meaningful work. More specifically:

1. When the kernel-based polling module wakes up due to timer expiration, it will enter the ON/OFF busy polling logic and the same logic repeats.
2. As a result of this repetition, and measurements taken therefrom, the internal common timer file descriptor is calibrated based on the average of the combination of both user-space device latencies and kernel-space device latencies over a particular time period. Even if the average becomes large, a kick (e.g., an autonomously-raised wakeup event) will guarantee that an execution of the kernel-based polling module is scheduled. Its beneficial to retain the timer file descriptor even in this approach as it allows minimizing the number of kicks by waking up periodically based on expected IO completion times for a stable running workload (e.g., an SPDK-assisted workload).
3. In some cases, it is possible to skip timer management by kicking the event file descriptor for every IO. However that is sometimes inefficient as that might incur a system call for every IO. As an alternative, use of a timer file descriptor plus the aforementioned ON/OFF busy polling avoids incurring a system call for every IO (e.g., in a multi-IO operation case).
4. In a single operation scenario, it is possible to calibrate the timer file descriptor such that the system call incurred for the kernel-based polling module wakeup call is outside of fast path (i.e., not in the context of the IO completion). This is because the wakeup is proactive, and is followed by ON/OFF busy polling which gives the window to detect that an IO has completed. If the calibration is accurate, this would not result in more system calls for the single operation scenario than would be incurred with the timer file descriptor case. This is because the calibration window would have dealt with spurious wakeups.

SPDK Integration With a Kernel-Based Polling Module Driver

One approach to be able to periodically poll the SPDK completion API would be to have a dedicated thread that would busy-poll in a non-stop manner. However, this method can lead to inefficiencies as in some cases, that approach might consume CPU cycles even in idle time. Considering this, what is needed is an efficient way to trigger polling for SPDK. One possible solution is to allow integration of the SPDK class, SPDKExecutor (which uses the above mentioned APIs for IO/polling) with a kernel-based polling module. As described in several implementations, the heretofore described kernel-based polling module implements ON/OFF busy polling which could be advantageously applied to minimize entry into a polling wait state.

Integration is implemented as follows:

1. A file descriptor and a callback function is be provided to the kernel-based polling module driver.
2. The kernel-based polling module driver and/or a timer calibration module accepts additional information as pertains to timer calibration.

File Descriptors for SPDK and Support for NVMe Devices

For SPDK file descriptors, an event file descriptor is created for every SPDKExecutor instance (there is one SPDKExecutor instance for every NVMe device). The event file descriptor is a kernel-supported mechanism used by user space applications for triggering notifications via kernel. Such event file descriptors are not necessarily backed by any real device, rather, an event file descriptor is a data structure on which read, write, and other events can be indicated, and on which read, write, and other commands can be performed. Each SPDKExecutor instance registers its event file descriptor as a pollable file descriptor. Registering an event file descriptor as pollable indicates to the kernel-based polling module driver that ON/OFF busy polling may be enabled for this file descriptor and that the corresponding callback should be invoked during its polling schedule/iterations.

System Architecture Overview

Additional System Architecture Examples

All or portions of any of the foregoing techniques can be partitioned into one or more modules and instanced within, or as, or in conjunction with, a virtualized controller in a virtual computing environment. Some example instances within various virtual computing environments are shown and discussed as pertains to FIG. 4A, FIG. 4B, FIG. 4C, and FIG. 4D.

Figure 4A:
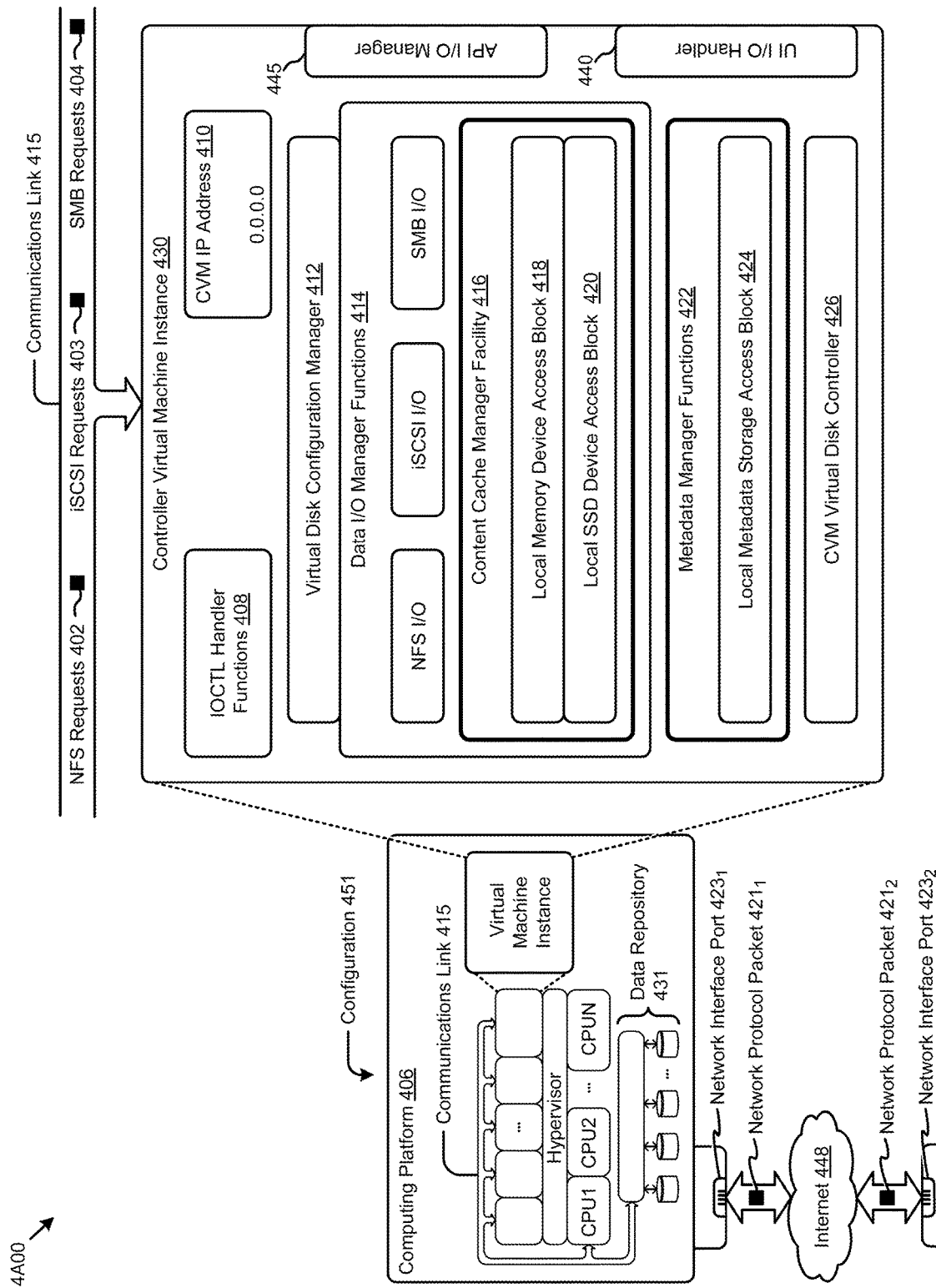
FIG. 4A, FIG. 4B, FIG. 4C, and FIG. 4D depict virtualization system architectures comprising collections of interconnected components suitable for implementing embodiments of the present disclosure and/or for use in the herein-described environments.

FIG. 4A depicts a virtualized controller as implemented in the shown virtual machine architecture 4A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 4A00 comprises a collection of interconnected components suitable for implementing embodiments of the present disclosure and/or for use in the herein-described environments. Moreover, virtual machine architecture 4A00 includes a virtual machine instance in configuration 451 that is further described as pertaining to controller virtual machine instance 430. Configuration 451 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 430.

In this and other configurations, a controller virtual machine instance receives block I/O storage requests as network file system (NFS) requests in the form of NFS requests 402, and/or internet small computer storage interface (iSCSI) block IO requests in the form of iSCSI requests 403, and/or Samba file system (SMB) requests in the form of SMB requests 404. The controller virtual machine (CVM) instance publishes and responds to an internet protocol (IP) address (e.g., CVM IP address 410). Various forms of input and output can be handled by one or more IO control handler functions (e.g., IOCTL handler functions 408) that interface to other functions such as data IO manager functions 414 and/or metadata manager functions 422. As shown, the data IO manager functions can include communication with virtual disk configuration manager 412 and/or can include direct or indirect communication with any of various block IO functions (e.g., NFS IO, iSCSI IO, SMB IO, etc.).

In addition to block IO functions, configuration 451 supports IO of any form (e.g., block IO, streaming IO, packet-based IO, HTTP traffic, etc.) through either or both of a user interface (UI) handler such as UI IO handler 440 and/or through any of a range of application programming interfaces (APIs), possibly through API IO manager 445.

Communications link 415 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 430 includes content cache manager facility 416 that accesses storage locations, possibly including local dynamic random access memory (DRAM) (e.g., through local memory device access block 418) and/or possibly including accesses to local solid state storage (e.g., through local SSD device access block 420).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 431, which in turn can be formatted into any one or more storage areas, and which can comprise parameterized storage accessible by a key (e.g., a filename, a table name, a block address, an offset address, etc.). Data repository 431 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 424. The data repository 431 can be configured using CVM virtual disk controller 426, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 451 can be coupled by communications link 415 (e.g., backplane, LAN, PSTN, wired or wireless network, etc.) and each instance may perform respective portions of sequences of instructions as may be required to practice embodiments of the disclosure.

The shown computing platform 406 is interconnected to the Internet 448 through one or more network interface ports (e.g., network interface port $423_1$ and network interface port $423_2$). Configuration 451 can be addressed through one or more network interface ports using an IP address. Any operational element within computing platform 406 can perform sending and receiving operations using any of a range of network protocols, possibly including network protocols that send and receive packets (e.g., network protocol packet $421_1$ and network protocol packet $421_2$).

Computing platform 406 may transmit and receive messages that can be composed of configuration data and/or any other forms of data and/or instructions organized into a data structure (e.g., communications packets). In some cases, the data structure includes program instructions (e.g., application code) communicated through the Internet 448 and/or through any one or more instances of communications link 415. Received program instructions may be processed and/or executed by a CPU as it is received and/or program instructions may be stored in any volatile or non-volatile storage for later execution. Program instructions can be transmitted via an upload (e.g., an upload from an access device over the Internet 448 to computing platform 406). Further, program instructions and/or the results of executing program instructions can be delivered to a particular user via a download (e.g., a download from computing platform 406 over the Internet 448 to an access device).

Configuration 451 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 42 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to implementing a common framework for kernel-assisted device polling. In some embodiments, a module may include one or more state machines and/or combinational logic used to implement or facilitate the operational and/or performance characteristics of kernel-assisted device polling.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of common framework for kernel-assisted device polling). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer implements a common framework for kernel-assisted device polling, and/or for improving the way data is manipulated when performing computerized operations pertaining to casting events from user-space devices into a kernel-based event routing facility.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 4, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 4B:
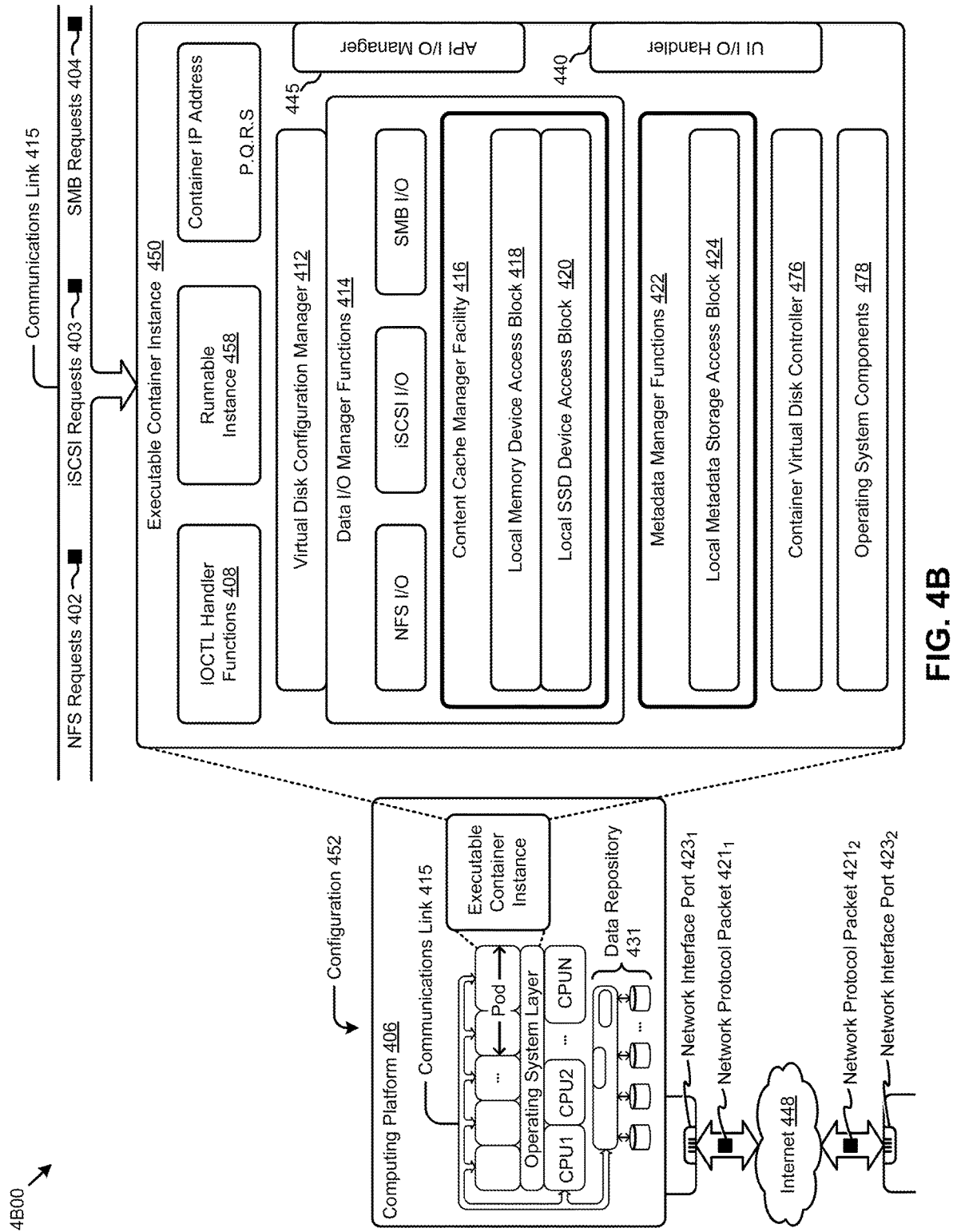

FIG. 4B depicts a virtualized controller implemented by containerized architecture 4B00. The containerized architecture comprises a collection of interconnected components suitable for implementing embodiments of the present disclosure and/or for use in the herein-described environments. Moreover, the shown containerized architecture 4B00 includes an executable container instance in configuration 452 that is further described as pertaining to executable container instance 450. Configuration 452 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 450). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 478, however such a separate set of operating system components need not be provided. As an alternative, an executable container can include runnable instance 458, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 476. Such a container virtual disk controller can perform any of the functions that the aforementioned CVM virtual disk controller 426 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 4C:
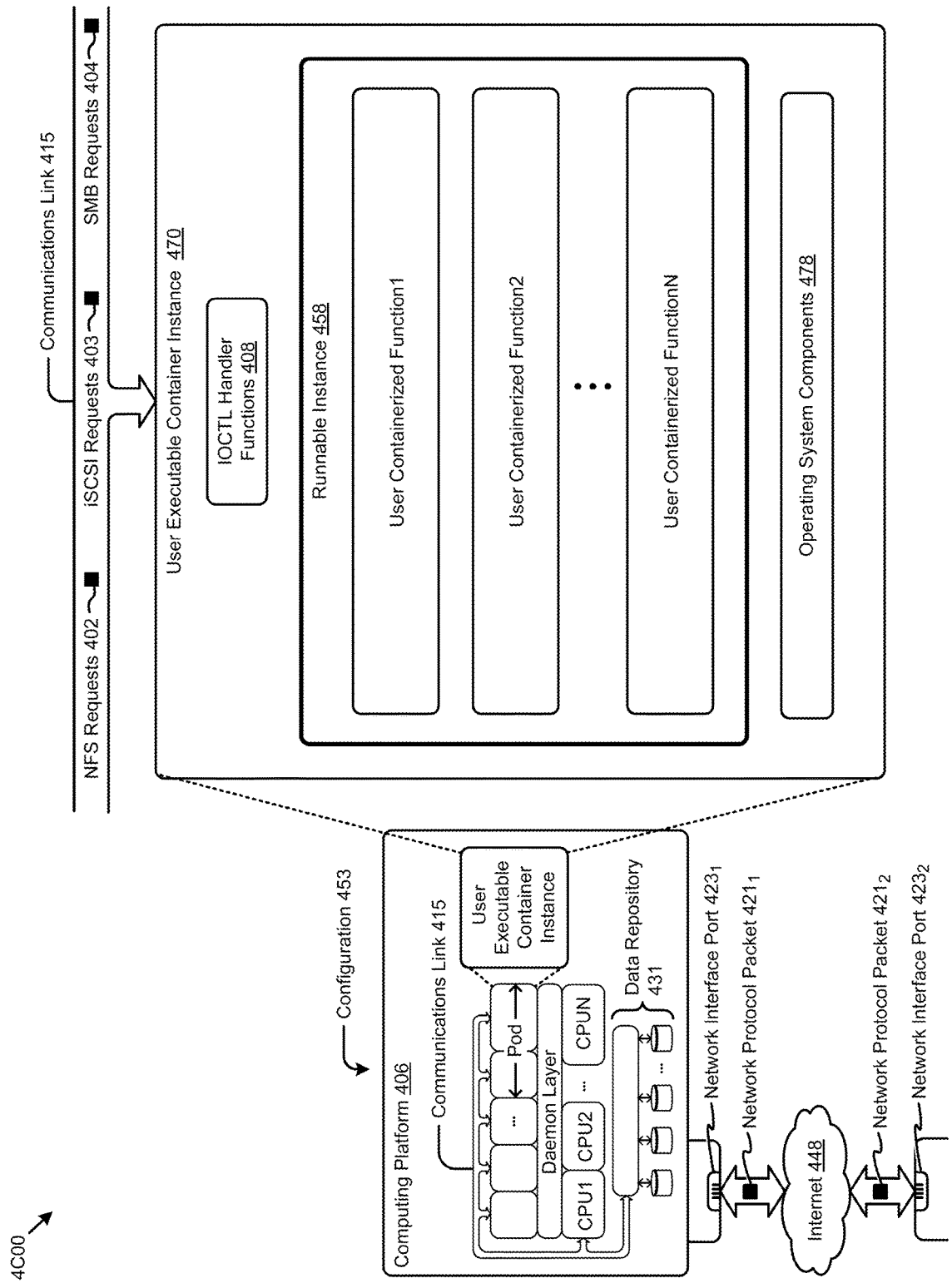

FIG. 4C depicts a virtualized controller implemented by a daemon-assisted containerized architecture 4C00. The containerized architecture comprises a collection of interconnected components suitable for implementing embodiments of the present disclosure and/or for use in the herein-described environments. Moreover, the shown daemon-assisted containerized architecture includes a user executable container instance in configuration 453 that is further described as pertaining to user executable container instance 470. Configuration 453 includes a daemon layer (as shown) that performs certain functions of an operating system.

User executable container instance 470 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 458). In some cases, the shown operating system components 478 comprise portions of an operating system, which portions are interfaced with or included in the runnable instance and/or any user containerized functions. In this embodiment of a daemon-assisted containerized architecture, the computing platform 406 might or might not host any operating system components other than operating system components 478. More specifically, the shown daemon might or might not host operating system components other than operating system components 478 of user executable container instance 470.

The virtual machine architecture 4A00 of FIG. 4A and/or the containerized architecture 4B00 of FIG. 4B and/or the daemon-assisted containerized architecture 4C00 of FIG. 4C can be used in any combination to implement a distributed platform that contains multiple servers and/or nodes that manage multiple tiers of storage where the tiers of storage might be formed using the shown data repository 431 and/or any forms of network accessible storage. As such, the multiple tiers of storage may include storage that is accessible over communications link 415. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 451 of FIG. 4A) to manage the interactions between the underlying hardware and user virtual machines or containers that run client software.

Distinct from user virtual machines or user executable containers, a special controller virtual machine (e.g., as depicted by controller virtual machine instance 430) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 4D:
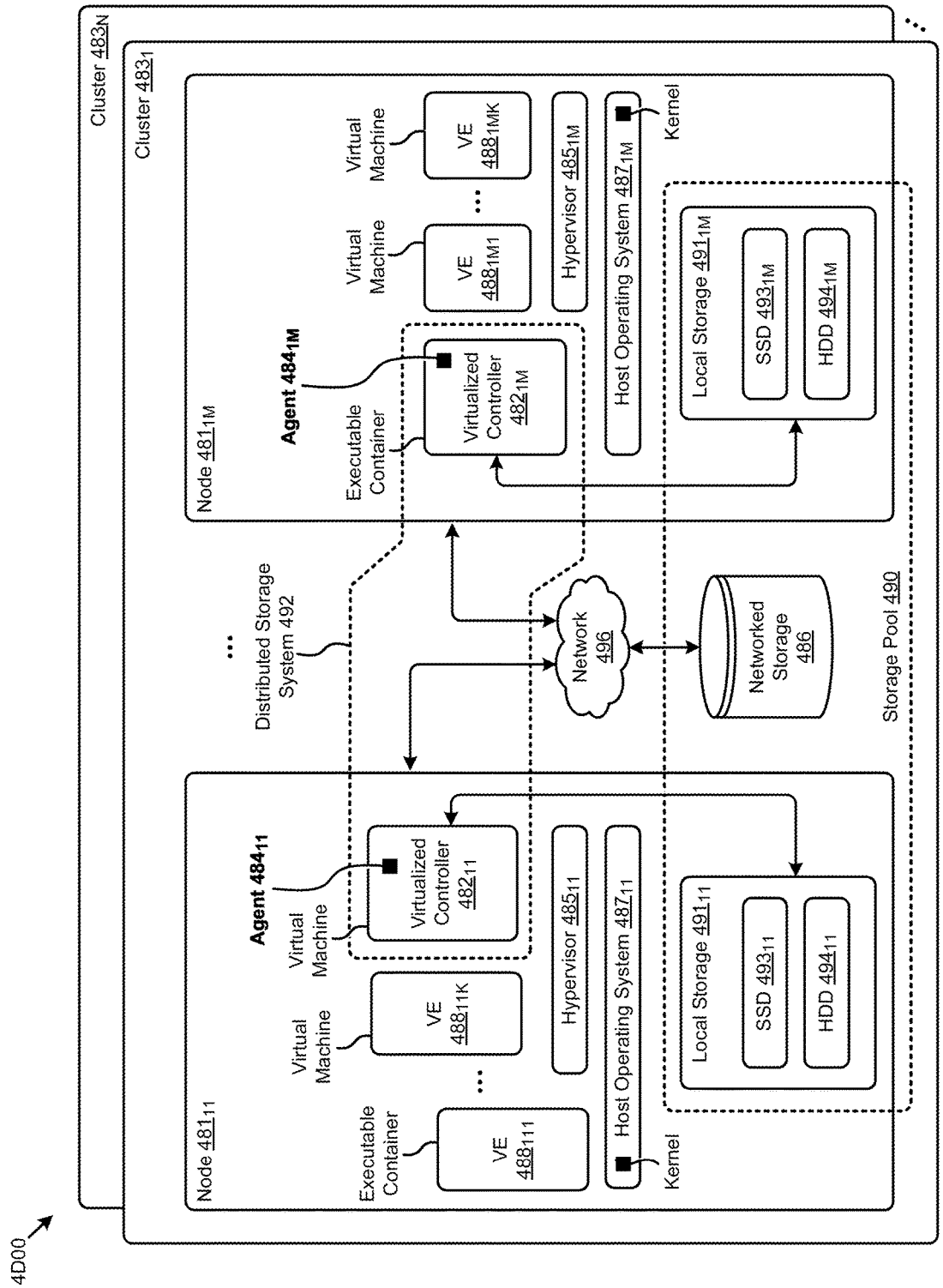

FIG. 4D depicts a distributed virtualization system in a multi-cluster environment 4D00. The shown distributed virtualization system is configured to be used to implement the herein disclosed techniques. Specifically, the distributed virtualization system of FIG. 4D comprises multiple clusters (e.g., cluster $483_1$, . . . , cluster $483_N$) comprising multiple nodes that have multiple tiers of storage in a storage pool. Representative nodes (e.g., node $481_{11}$, . . . , node $481_{1M}$) and storage pool 490 associated with cluster $483_1$ are shown. Each node can be associated with one server, multiple servers, or portions of a server. The nodes can be associated (e.g., logically and/or physically) with the clusters. As shown, the multiple tiers of storage include storage that is accessible through a network 496, such as a networked storage 486 (e.g., a storage area network or SAN, network attached storage or NAS, etc.). The multiple tiers of storage further include instances of local storage (e.g., local storage $491_{11}$, . . . , local storage $491_{1M}$). For example, the local storage can be within or directly attached to a server and/or appliance associated with the nodes. Such local storage can include solid state drives (SSD $493_{11}$, . . . , SSD $493_{1M}$), hard disk drives (HDD $494_{11}$, . . . , HDD $494_{1M}$), and/or other storage devices.

As shown, any of the nodes of the distributed virtualization system can implement one or more user virtualized entities (e.g., VE $488_{111}$, . . . , VE $488_{11K}$, . . . , VE $488_{1M1}$, . . . , VE $488_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $487_{11}$, . . . , host operating system $487_{1M}$), while the VMs run multiple applications on various respective guest operating systems. Such flexibility can be facilitated at least in part by a hypervisor (e.g., hypervisor $485_{11}$, . . . , hypervisor $485_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $487_{11}$, . . . , host operating system $487_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 490 by the VMs and/or the executable containers.

Multiple instances of such virtualized controllers can coordinate within a cluster to form the distributed storage system 492 which can, among other operations, manage the storage pool 490. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $481_{11}$ can interface with a controller virtual machine (e.g., virtualized controller $482_{11}$) through hypervisor $485_{11}$ to access data of storage pool 490. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 492. For example, a hypervisor at one node in the distributed storage system 492 might correspond to software from a first vendor, and a hypervisor at another node in the distributed storage system 492 might correspond to a second software vendor. As another virtualized controller implementation example, executable containers can be used to implement a virtualized controller (e.g., virtualized controller $482_{1M}$) in an operating system virtualization environment at a given node. In this case, for example, the virtualized entities at node $481_{1M}$ can access the storage pool 490 by interfacing with a controller container (e.g., virtualized controller $482_{1M}$) through hypervisor $485_{1M}$ and/or the kernel of host operating system $487_{1M}$.

In certain embodiments, one or more instances of an agent can be implemented in the distributed storage system 492 to use and/or facilitate use of the herein disclosed techniques. Specifically, agent $484_{11}$ can be implemented in the virtualized controller $482_{11}$, and agent $484_{1M}$ can be implemented in the virtualized controller $482_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to casting events from user-space devices into a kernel-based event routing facility can be brought to bear through implementation of any one or more of the foregoing embodiments. Moreover, any aspect or aspects of providing a common, high-performance mechanism for kernel-assisted device polling can be implemented in the context of any computing system, and/or any operating system, and/or any of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for providing a common polling mechanism for handling kernel-based polling for both kernel-space devices and user-space devices, the acts comprising:
    performing kernel-based polling on a first device, the first device being a kernel-space device having a first device driver in an operating system kernel, wherein the kernel-based polling is performed using a first device file descriptor associated with the first device driver for the first device in the operating system kernel; and
    performing kernel-based polling on a second device, the second device being a user-space device, wherein the kernel-based polling on the second device is performed by creating a second device file descriptor that is not associated with a corresponding device driver in the operating system kernel.

2. The non-transitory computer readable medium of claim 1, wherein the kernel-based polling on the first device and the kernel-based polling on the second device implements a single polling schedule that is applied to both the kernel-space device and the user-space device.

3. The non-transitory computer readable medium of claim 2, wherein the single polling schedule that is applied to both the kernel-space device and the user-space device is calibrated based on first latencies of the kernel-space devices and second latencies of the user-space devices.

4. The non-transitory computer readable medium of claim 1, further comprising instructions which, when stored in memory and executed by the processor cause the processor to perform further acts of:
  initializing the first device file descriptor for the first device that is associated with the first device driver in the operating system kernel; and
  initializing the second device file descriptor for the second device that is not associated with a corresponding device driver in the operating system kernel.

5. The non-transitory computer readable medium of claim 1, wherein the first device is memory mapped into kernel space and wherein the second device is memory mapped into user space.

6. The non-transitory computer readable medium of claim 1, wherein the operating system kernel is a Linux kernel, and wherein the kernel-based polling on the first file descriptor is initiated in response to a first Linux system call referring to the kernel-space device, and wherein the kernel-based polling on the second device file descriptor is initiated in response to a second Linux system call referring to the user-space device.

7. The non-transitory computer readable medium of claim 1, further comprising instructions which, when stored in memory and executed by the processor cause the processor to perform further acts of modifying, in response to an event on the second device file descriptor, a process table to indicate a user-space process is ready for additional processing.

8. The non-transitory computer readable medium of claim 1, wherein the first device is a network device and the second device is at least one of, a remote direct memory access (RDMA) device, or a non-volatile memory express (NVMe) device.

9. A method for providing a common polling mechanism for handling kernel-based polling for both kernel-space devices and user-space devices, the method comprising:
  performing kernel-based polling on a first device, the first device being a kernel-space device having a first device driver in an operating system kernel, wherein the kernel-based polling is performed using a first device file descriptor associated with the first device driver for the first device in the operating system kernel; and
  performing kernel-based polling on a second device, the second device being a user-space device, wherein the kernel-based polling on the second device is performed by creating a second device file descriptor that is not associated with a corresponding device driver in the operating system kernel.

10. The method of claim 9, wherein the kernel-based polling on the first device and the kernel-based polling on the second device implements a single polling schedule that is applied to both the kernel-space device and the user-space device.

11. The method of claim 10, wherein the single polling schedule that is applied to both the kernel-space device and the user-space device is calibrated based on first latencies of the kernel-space devices and second latencies of the user-space devices.

12. The method of claim 9, further comprising:
  initializing the first device file descriptor for the first device that is associated with the first device driver in the operating system kernel; and
  initializing the second device file descriptor for the second device that is not associated with a corresponding device driver in the operating system kernel.

13. The method of claim 9, wherein the first device is memory mapped into kernel space and wherein the second device is memory mapped into user space.

14. The method of claim 9, wherein the operating system kernel is a Linux kernel, and wherein the kernel-based polling on the first file descriptor is initiated in response to a first Linux system call referring to the kernel-space device, and wherein the kernel-based polling on the second device file descriptor is initiated in response to a second Linux system call referring to the user-space device.

15. The method of claim 9, further comprising modifying, in response to an event on the second device file descriptor, a process table to indicate a user-space process is ready for additional processing.

16. The method of claim 9, wherein the first device is a network device and the second device is at least one of, a remote direct memory access (RDMA) device, or a non-volatile memory express (NVMe) device.

17. A system for providing a common polling mechanism for handling kernel-based polling for both kernel-space devices and user-space devices, the system comprising:
  a storage medium having stored thereon a sequence of instructions; and
  a processor that executes the sequence of instructions to cause the processor to perform acts comprising,
    performing kernel-based polling on a first device, the first device being a kernel-space device having a first device driver in an operating system kernel, wherein the kernel-based polling is performed using a first device file descriptor associated with the first device driver for the first device in the operating system kernel; and
    performing kernel-based polling on a second device, the second device being a user-space device, wherein the kernel-based polling on the second device is performed by creating a second device file descriptor that is not associated with a corresponding device driver in the operating system kernel.

18. The system of claim 17, wherein the kernel-based polling on the first device and the kernel-based polling on the second device implements a single polling schedule that is applied to both the kernel-space device and the user-space device.

19. The system of claim 18, wherein the single polling schedule that is applied to both the kernel-space device and the user-space device is calibrated based on first latencies of the kernel-space devices and second latencies of the user-space devices.

20. The system of claim 17, further comprising instructions which, when stored in memory and executed by the processor cause the processor to perform further acts of:
  initializing the first device file descriptor for the first device that is associated with the first device driver in the operating system kernel; and
  initializing the second device file descriptor for the second device that is not associated with a corresponding device driver in the operating system kernel.

21. The system of claim 17, wherein the first device is memory mapped into kernel space and wherein the second device is memory mapped into user space.

22. The system of claim 17, wherein the operating system kernel is a Linux kernel, and wherein the kernel-based polling on the first file descriptor is initiated in response to a first Linux system call referring to the kernel-space device, and wherein the kernel-based polling on the second device file descriptor is initiated in response to a second Linux system call referring to the user-space device.

23. The system of claim 17, further comprising instructions which, when stored in memory and executed by the processor cause the processor to perform further acts of modifying, in response to an event on the second device file descriptor, a process table to indicate a user-space process is ready for additional processing.

24. The system of claim 17, wherein the first device is a network device and the second device is at least one of, a remote direct memory access (RDMA) device, or a non-volatile memory express (NVMe) device.

* * * * *